United States Patent [19]

Poetsch

[11] 4,035,835
[45] July 12, 1977

[54] SYSTEM FOR AUTOMATIC CORRECTION OF THE COLOR BALANCE BETWEEN THE PRIMARY SIGNALS OF A COLOR SIGNAL SOURCE

[75] Inventor: Dieter Poetsch, Ober Ramstadt, Germany

[73] Assignee: Robert Bosch G.m.b.H., Stuttgart, Germany

[21] Appl. No.: 726,143

[22] Filed: Sept. 24, 1976

Related U.S. Application Data

[63] Continuation-in-part of Ser. No. 620,409, Oct. 7, 1975.

[30] Foreign Application Priority Data

Sept. 11, 1974 Germany .......................... 2448505
Sept. 27, 1975 Germany .......................... 2543218

[51] Int. Cl.² ..................................... H04N 9/535
[52] U.S. Cl. ............................................. 358/29
[58] Field of Search .................... 358/29, 28, 40

[56] References Cited

U.S. PATENT DOCUMENTS

| 3,737,561 | 6/1973 | Boer | 358/28 X |
| 3,786,177 | 1/1974 | Bazin | 358/29 |

FOREIGN PATENT DOCUMENTS

| 2,214,217 | 9/1972 | Germany | 358/29 |
| 1,121,872 | 7/1968 | United Kingdom | 358/29 |

Primary Examiner—Richard Murray
Assistant Examiner—Mitchell Saffian
Attorney, Agent, or Firm—Littlepage, Quaintance, Murphy, Richardson & Webner

[57] ABSTRACT

A system for correcting color balance of a color television picture to remove tinges of color caused by unbalance. Control signals for color correction are derived and stored from data available in those periods when luminosity is below a lower limit of about 7% or above an upper limit of about 95% and when chroma-saturation is below a prespecified level, for example 20%.

21 Claims, 5 Drawing Figures

SYSTEM FOR AUTOMATIC CORRECTION OF THE COLOR BALANCE BETWEEN THE PRIMARY SIGNALS OF A COLOR SIGNAL SOURCE

CROSS-REFERENCE TO RELATED APPLICATIONS

This application is a continuation-in-part of my co-pending application Ser. No. 620,409, filed October 7, 1975.

BACKGROUND OF THE INVENTION

1. Field of the Invention

The invention relates to a system for automatic correction of the color balance between the primary signals of a color-signal source.

2. Description of the Prior Art

From German Offenlegungsschrift No. 2,237,784, it is known to modify the chromaticity of a color-television picture by means of a color corrector. The known color corrector contains operating elements by means of which the chromaticity in certain luminosity areas of the color television picture is manually adjustable according to the subjective judgment of a viewer.

Furthermore, from German Offenlegungsschrift No. 2,141,685, it is know to carry out automatically color corrections of a color movie in a preprogrammed manner. It is necessary for such a preprogrammed color correction to have sufficient time for a test run of the color movie. During the test run, the chromatic aberrations determined subjectively by a viewer are stored scene by scene. During the broadcast, the individual scenes are corrected as a function of the stored chromatic aberration values. With certain color television broadcasts, such as news broadcasts with live insertions from other television stations, the required test run is not possible. Such live insertions are broadcast without having been previously viewed. Since, moreover, the scenes in newscasts change very often, the picture engineer does not have sufficient chance to remove recognized chromatic aberrations during the showing of the individual scenes.

To eliminate this disadvantage, U.S. Pat. No. 3,735,026 proposed an automatic color-correction system wherein the color balance of the red and blue chromaticity-value signals is automatically balanced with respect to the green color-value signal of a color-signal source. The balancing process takes place in this system when the amplitude of the luminance signal is smaller than 7% or larger than 95% of the maximum luminance-signal value, i.e. when it corresponds to the black or white values of the luminance signal. This balancing criterion rests on the assumption that the voltage difference of the color signals in black or white picture portions becomes zero. On the other hand, the existence of a color-signal difference in black or white picture portions shows that a picture stain (i.e., color tinge or suffusion of discoloration over the picture) exists, and therefore no color balance between the color signals exists. This system, however, exhibits undesired effects upon blue and skin-colored picture portions. A dark blue is seen as black and a bright yellow as white. Although no color stain in the color-television picture is present, the aforementioned balancing criterion alone would lead to further chromatic aberrations. For this reason it was further proposed to eliminate the balancing process in dark-blue and in bright-yellow hues. The hue-recognition circuits necessary for this purpose are, however, very expensive. Furthermore, the balancing area, already restricted to less than 7% and more than 95% of the luminance signal, is further restricted by this additional limitation. Because of the measurement of the brightest and the darkest picture points with respect to the voltage difference of their color signals, this procedure depends very much on the picture contents. Satisfactory color reproduction requires a correction of the gray values (gamma correction). This correction could hitherto not be carried out in red-green-blue (RGB) systems since, for this purpose, saturation information that is independent of luminosity is required.

SUMMARY OF THE INVENTION

The present invention relates to a system for automatic correction of the color balance between the primary signals of a color-signal source. By means of such a system, chromatic aberrations are reliably recognized and eliminated by color-balance correction in all luminosity areas of the luminance signal.

This problem is solved according to the invention by a device wherein an additional stage is assigned to each primary-signal channel and a primary signal is fed to one input of this additional stage while the correction signal of a correction stage is fed to the other input, and wherein the primary signals which can be tapped at the output of the additional stages are fed to a color corrector. When a prespecified luminosity stage is detected and when at the same time the chroma-saturation ranges below a prespecified chroma-saturation threshold, the color corrector recognizes in the color-television picture a chromaticity present at that moment. It derives and stores, as a function of the recognized chromaticity, control signals which regulate the correction stages in the primary signal channels in such a manner that defects in the color balance between the primary signal are lessened.

In contrast to the known color balance by level modification of the primary signal, the system of the invention has the advantage that, by simple addition of correction signals to the individual primary signals, a readily disconnectable and very temperature-stable color correction can be carried out. The derivation of the correction signals is essentially based on facts as follows. A color stain has usually no great chroma-saturation. This requires that picture portions with a chroma-saturation of, for example, more than 20% be excluded from the detection of the chromatic error. Dominant colors, for example, a red rose in the foreground of a scene, cannot adulterate the correction of the color balance. A picture stain extends over the whole picture. In most cases, colored picture details fill only a portion of the picture. In an integration of the signals with chroma-saturations of 20% for example, this is taken into account. The integration takes place over the whole picture so that the picture stain is detected in preference to the colored details. The threshold between color stain and colored picture detail is fixed and is to be independent of scene illumination and level adjustment of the picture transmitter. This requirement is fulfilled by a standardization of the color-difference signals are, for example, divided by the luminance signal, so that a chroma-saturation signal independent of the luminance signal originates.

BRIEF DESCRIPTION OF THE DRAWINGS

Further details are described more explicitly in the following with the aid of an embodiment of the system of the invention by means of figures.

DESCRIPTION OF THE PREFERRED EMBODIMENT

In the figures, circuit groups with similar effects are provided with the same reference symbols.

Figure 1:
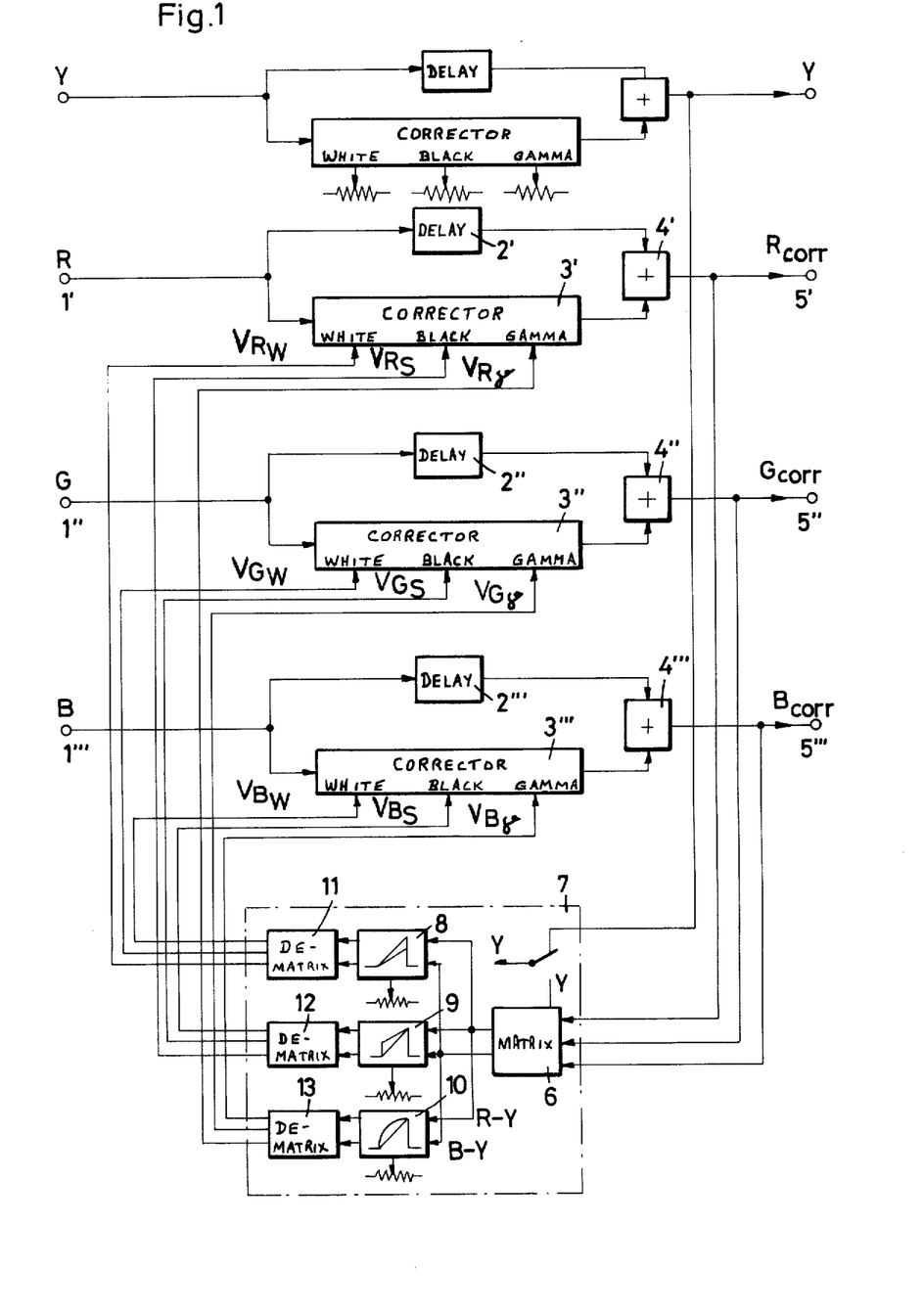
FIG. 1 is a block diagram of an embodiment of the invention.

The block diagram of FIG. 1 shows three separate channels for the three primary signals R, G, and B, and a further channel for a separate luminance signal Y. The three channels for the three primary signals R, G, and B are structured in the same manner in order to achieve control, which is as similar as possible for the individual parameters in the three channels. From a color signal source (not shown) the three primary signals R, G, and B arrive at corresponding input terminals 1', 1'' and 1'''. In the individual channels, the supplied primary signals R, G, and B are respectively fed in parallel to a delay stage 2', 2'' and 2''' and to a corrector stage 3', 3'', and 3'''. Each of the corrector stages 3', 3'', and 3''' is provided with three adjustment inputs for a white, black, and gamma correction of the supplied primary signals. Such correction stages are known and are present, for example, in the amplifier stages of color-film scanners. The delay stages 2', and 2'' serve for adjustment of the transit time of the supplied primary signals with respect to the signal-transit time in respective corrector stage 3', 3'', and 3'''. Adding stage 4', 4'' and 4''' add the delayed primary signal and the correction signal tapped at the output of the corrector stage. At the output terminals 5', 5'', and 5''' of the adding stages 4', 4'', and 4''', corrected primary signals $R_{corr}$, $G_{corr}$, and $B_{corr}$ are provided. The corrected primary signals are also fed to a matrix 6 in a color corrector 7. Matrix 6 is well-known per se and serves for matricizing the primary signals into color-difference signals R − Y and B − Y and into a luminance signal Y. The matricizing of a luminance signal Y from the corrected primary signals can be dispensed with when the primary signal source is provided with a separate luminance channel. In FIG. 1, the upper channel serves for transmission and manual correction of the luminance signal. In color corrector 7, whose structure and function are described in greater detail below, bright picture portions are detected in a stage 8, dark picture portions are detected in a stage 9 and medium picture portions in a stage 10. When, at the same time, the chroma-saturation ranges below a certain chroma-saturation threshold, control signals of a specific chromaticity are derived and stored. For the purpose of being transformed into a RGB plane, the control signals are matricized, by means of matrices 11 to 13, into corresponding control voltages $V_{RW}$, $V_{GW}$, and $V_{EW}$, or $V_{RS}$, $V_{GS}$, and $V_{ES}$, or $U_{R\gamma}$, or $U_{G\gamma}$, or $U_{B\gamma}$. In the corrector stages 3', 3'', and 3''', a correction of the color balance between the primary signals as a function of the control voltages for the luminosity areas white, black and gamma is then carried out.

Figure 2:
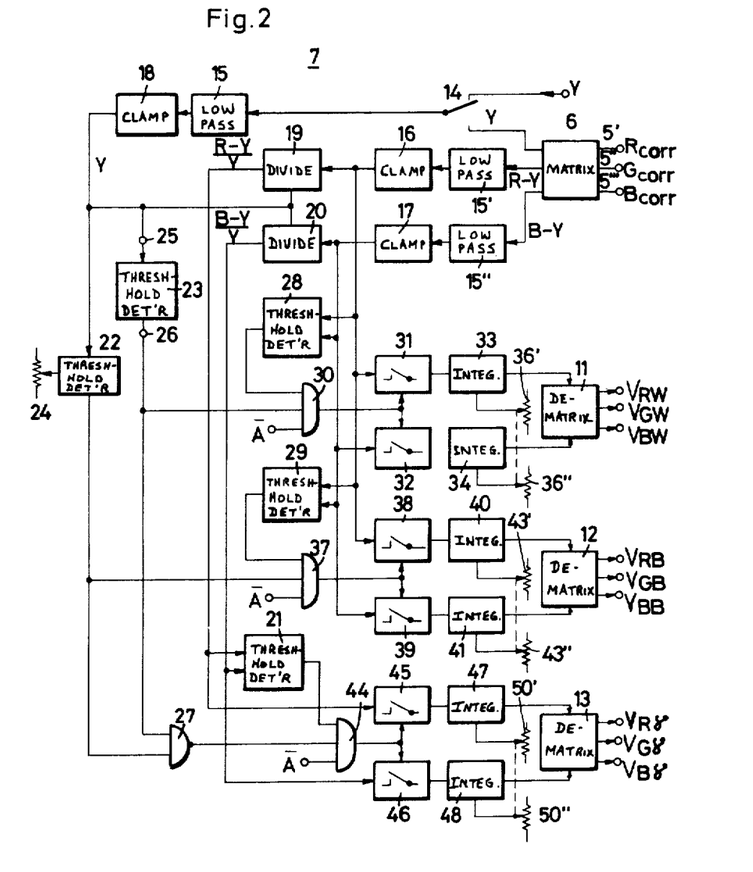
FIG. 2 is a block diagram of a color corrector for the derivation of control signals for a RGB system.

FIG. 2 shows a detailed block diagram of the color corrector 7 mentioned in FIG. 1. The corrected color signals from the outputs of adding stages 4', 4'', and 4''' (FIG. 1) are fed into matrix 6 through terminals 5', 5'', and 5'''. Matrix 6 has the function of matricizing the corrected primary signals into the color difference signals R − Y and B − Y and, if needed, into a luminance signal Y. High-frequency signal portions of the color-difference signals are suppressed by low-pass filters 15' and 15''. When the color-signal source is not provided with a separate luminance signal channel, the matricized luminance signal Y is fed via a switch 14 to a low-pass filter 15 by means of which high-frequency signal portions, for example static signals, are suppressed. By means of terminal stages 16, and 17 and 18, the color difference signals R − Y and B − Y and the luminance signal Y are respectively clamped to a selected potential. For the production of standardized color-difference signals, the color-difference signals R − Y and B − Y are fed to the dividend input of respective division circuits 19 and 20. The clamped luminance signal Y is connected to the divisor inputs of division circuits 19 and 20. At the quotient output of division circuit 19 the standardized (normalized) color-difference signal (R − Y)/Y can be obtained, and at the output of division circuit 20, the standardized color difference signal (B − Y)/Y can be obtained. Division circuits per se are known and consist, for example, of a multiplier stage with inverting operational amplifiers. The standardization of the two color-difference signals is carried out in order to obtain an unambiguously defined application point in the gamma range for a series-connected chroma-saturation threshold detector 21. The structure and function of such a chroma-saturation threshold detector is discussed in greater detail below.

By means of two threshold-value circuits 22 and 23, various luminosity stages in the color televison picture are detected. For this purpose a luminance signal proportional to the luminosity stages is fed to the threshold-value circuits. The threshold of the threshold-value circuit 22 is adjusted by means of an adusting element 24 in such a way that, at the output of threshold-value circuit 22, a charcteristic signal is always obtained the moment when the clamped luminance signal ranges within 0% to about 10% of the maximum luminance signal. By means of threshold-value circuit 23, bright picture portions in the color-television picture are recognized. For this purpose, the luminance signal connected to terminal 25 determines the peak white balance during several picture scans. As a function of the determined peak white value in the luminance signal, the threshold of the threshold-value circuit 23 is shifted. The threshold ranges in this instance 10% below the determined peak white value. The threshold is, however, not to drop below a level of 75% of the luminance signal. Charcteristic signals can therefore be obtained from the output terminal 26 of threshold value circuit 23 when the luminance signal exceeds 75%. By logical connection to a NAND gate 27, a further characteristic signal can be derived which comprises the gray luminosity area of the luminance signal between about 10 and 75% of the luminance signal.

The matricized and clamped color difference signals R − Y and B − Y are fed to chroma-saturation threshold detectors 28 and 29. In these chroma-saturation threshold detectors, picture portions of small chroma-saturation are recognized. The signals thus obtained are then logically connected. Three signals as follows, the signal obtained at the output of the chroma-saturation threshold detector 28, the characteristic signal at the output of the threshold-value circuit 23 and an inverse blanking signal $\overline{A}$, are fed to the inputs of an AND gate 30. At the output of the AND gate 30, a switch signal can be obtained which closes the contact paths of two electronic swithes 31 and 32 when the primary signals are not blacked-out, when bright picture portions are recognized in the color picture, and when the chroma-saturation of the picture portion concerned ranges below the chroma-saturation, determined by chroma-saturation threshold detector 28. When the contact path of electronic switch 31 is closed, the matricized color-difference signal R − Y is connected to the input of an integration circuit 33. The matricized color difference signal B − Y is fed to the input of another intergration circuit 34 by way of the closed contact path of electronic switch 32. A first control signal can be obtained at the output of integration stage 34. By means of a dematrix 11, the two control signals are matricized back into the RGB plane. Thus three contol voltages $V_{RW}$, $V_{GW}$, and $V_{BW}$ are obtained which operate in correction stages 3′, 3″, and 3‴ to correct a color stain in the bright picture portions of a color television picture by changing the color balance between the primary signals. The control devices 36′ and 36″ serve for adjusting the command variable between the two control signals at the output of integration stages 33 and 34. This makes manual adjustment possible in the automatic correction sequence of the color corrector. Control devices 36′ and 36″ consist, for example, of two potentiometers whose sliding surfaces are imparted different potentials and whose slides are mechanically coupled with a control stick in such a manner that a color circle is reproduced.

Similar to the arrangement described above for the derivation of control voltages in bright picture areas, the following arrangement is constructed for dark picture areas. The signal obtained at the output of chroma-saturation threshold detector 29, the characteristic signal obtained at the outlet of threshold-value switch 22, and the inverse blanking signal $\overline{A}$ are fed to the three inputs of an AND gate 37. The switch signal present at the outlet of AND gate 37 serves to control the contact paths of electronic switches 38 and 39. When the contact path of electronic switch 38 is closed, the matricized color-difference signal R − Y is fed to an integration circuit 40, and when the contact path of electronic switch 39 is closed, the matricized color difference signal B − Y is fed to an integration circuit 41. The control signals tapped at the output of integration circuits 40 and 41 are matricized back by means of a dematrix. The control signals $V_{RB}$, $V_{GB}$, and $V_{BW}$ thus produced are fed to correction stages 3′, 3″ and 3‴ and there serve for correcting color stains in the dark portions of a television picture. The structure and the mode of operation of control device 43′ and 43″ corresponds to control device 36′ and 36″. The time constants of integration circuits 33, 34, 40, and 41 are designed, for example, for two to three half pictures.

An AND gate 44 serves for the derivation of a switch signal for the contact paths of electronic switches 45 and 46. For this purpose, the signal tapped at the output of chroma-saturation threshold detector 21, the characteristic signal tapped at the output of a NAND gate 27, and the inverse blanking signal $\overline{A}$ are fed to the inputs of AND gate 44. The switch signal which controls the contact paths of electronic switches 45 and 46 closes the contact paths only when no blanking interval in the primary signals exists, when chroma-saturation ranges below the chroma-saturation threshold detector 21, and when medium luminosity stages are recognized in the color television picture. In contrast to the above-described derivations of the control voltages for the bright and dark picture portions of a color television picture, in this embodiment, the standardized color-difference signals (R − Y)/Y and (B − Y)/Y are fed, by way of the contact paths of electronic switches 45 and 46, to integration stage 47 and 48. After a subsequent back-matrization by means of a dematrix 13, three control voltages, $V_{RY}$, $V_{GY}$, and $V_{BY}$, are fed to correction stages 3′, 3″ and 3‴. These voltages serve to correct color stains in medium luminosity area of the color television picture. By means of a control device 50′ and 50″, the control voltages are manually controllable.

Figure 3:
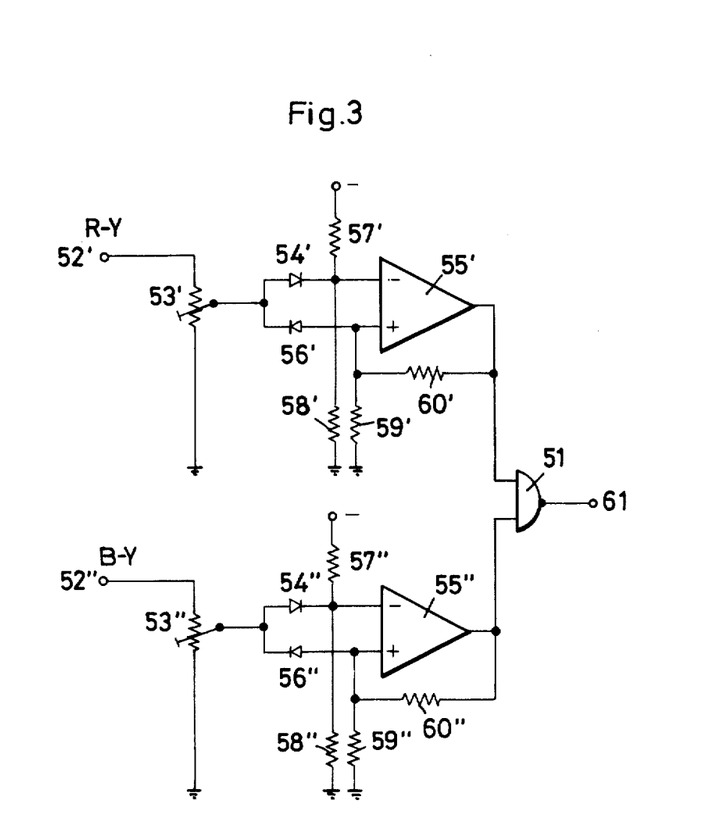
FIG. 3 is a circuit diagram of a chroma-saturation threshold detector.

FIG. 3 shows the circuit arrangement of a preferred embodiment of chroma-saturation threshold detectors 28, 29 and 21. This circuit arrangement consists essentially of two amplifier devices whose outputs are logically connected with a NAND gate. One of the matricized or the standardized color-difference signals in each case is fed to the amplifying devices. Since the two amplifying devices are equal in structure and function, only the upper amplifying device 55′ of FIG. 3 is described below. It is assumed that the matricized color-difference signal R − Y is connected to a terminal 52′. Terminal 52′ is connected to a potentiometer 53′ at whose slide a part of the color-difference voltage applied can be obtained. The color-difference signal thus reduced in level is fed, via a diode 54′, to the inverse input of a sum-and-difference amplifier 55′ and via a diode 56′ to the non-inverse input of said amplifier. Diode 54′ is biased by means of a resistor 57′ in such a way that, at a voltage level of zero voltage the anode of diode 54′, the diode blocks. The output of sum-and-difference amplifier 55′ is in the H state (H = high). When then the color-difference signal at the anode of diode 54′ becomes more positive and surpasses the threshold voltage of the diode, the diode becomes conductive, and a current flows through the diode via a resistor 58′. A positive voltage drop with respect to the ground potential is produced over resistor 58′. The positive voltage thus present at the inverse input of the sum-and-difference amplifier 55′ produces a voltage leap from H to L (L = low), at the output of sum-and-difference amplifier 55′. The L state is maintained until the voltage drops below the threshold voltage of diode 54′ and the diode blocks again. In the blocked state of diode 54′, the output level of sum-and-difference amplifier 55′ jumps back from L to H. If it is assumed that the color difference signal R − Y becomes negative, diode 54′ is blocked further, and diode 56′ becomes conductive when reaching its threshold voltage. A current flows through diode 56′ and a resistor 59′ to ground potential and leads to a negative voltage at the non-inverse input of sum-and-difference amplifier 55′. Thereby the output level of sum-and-difference amplifier 55' is switched from H to L. This state is maintained until the input voltage drops below the threshold voltage of diode 56'. The amplifying device has therefore the function of a so-called window discriminator. When a specific color-difference voltage is exceeded in positive as well as in negative direction, the output level of sum-and-difference amplifier 55' assumes the L-state. By means of a resistor 60 positioned between the non-inverse input and the output of sum-and-difference amplifier 55', a certain hysteresis conduct of the sum-and-difference amplifier is produced. Color-difference signals with superimposed noise portions, because of this measure, do not result in a continuous back-and-forth switching of the amplifier device. A signal with L level can only be obtained at the output of NAND gate 51 when the two output levels of sum-and-difference amplifiers 55' and 55" are in the H-state.

As initially mentioned, saturation threshold detectors 21, 28, and 29 are of the same structure. By corresponding adjustment of potentiometers 53' and 53", the chroma-saturation threshold detector of FIG. 3 can be used for all three luminosity areas. In this case, smaller color-difference signal levels must be fed to a chroma-saturation threshold detector for the derivation of control voltages in the bright picture areas than in the derivation of control voltages in the darker picture portions. This fact can be explained by the combination of the luminance signal from the three primary signals.

Figure 4:
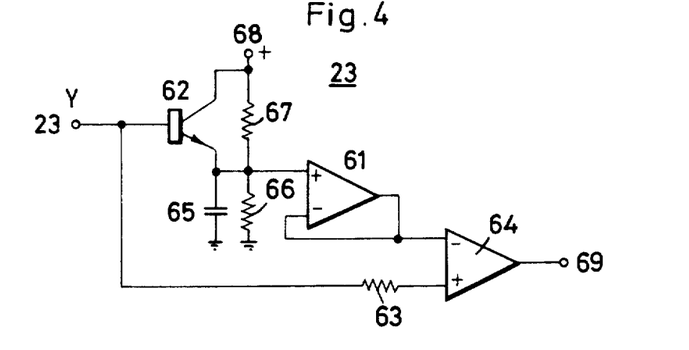
FIG. 4 is a circuit diagram of a threshold-value connection whose threshold value slides as a function of a peak white value in the luminance signal.

In FIG. 4 the threshold-value circuit 23 is represented in greater detail. The luminance signal Y arrives at the base electrode of a transistor 62 once via terminal 23 and again via a resistor 63 at the non-inverse input of a sum-and-difference amplifier 64. Transistor 62 is connected as an emitter follower. This emitter follower, however, differs in two respects from normal collector basis circuits. It differs by the RC element 65 and 66 which is switched by the emitter electrode to ground potential, and it differs by a resistor 67 which connects the emitter electrode of transistor 62 to a positive potential at terminal 68. The function of this transistor stage can be explained as follows: The luminance signal Y present at terminal 23 arrives at a capacitor with a voltage difference of $V_{BE} = 0.7$ V, and it charges the capacitor to a peak white value in the luminance signal. The emitter voltage corresponds at first to the peak white value of the luminance signal. When the voltage of the luminance signal decreases, for example, when the color television picture becomes darker, the emitter is kept at the voltage level of the peak white value, and the base becomes more negative. Transistor 62 begins to block. Since, however, capacitor 65 is discharged via resistor 66 with a time constant which is about one second, "the point of operation slides" as a function of the peak white value in the luminance signal. In order to avoid a complete discharge of capacitor 65, resistor 67 is provided. This resistor 67 serves for setting a specific limiting value in the luminance signal below which transistor 62 is to block. This limiting value is, for example, about 70% of the luminance signal. The signal tapped at the emitter electrode of transistor 62 is fed via an impedance transformer 61 to the inverse input of sum-and-difference amplifier 64. As a function of the voltage level at the inverse input of sum-and-difference amplifier 64, luminance signal portions can be tapped at the output of sum-and-difference amplifier 64 by means of terminal 69 which signal portions range by 10% below the determined peak white value. This requires at terminal 23 a luminance signal $V_{SS}$.

In comparison with known threshold-value circuits for the detection of bright picture details, this curcuit arrangement has the advantage that underexposed films or, with a switching-off of the automatic level control, in a film scanner luminance signal levels which are marked white can be included in the measurement and thus be employed for color correction.

Figure 5:
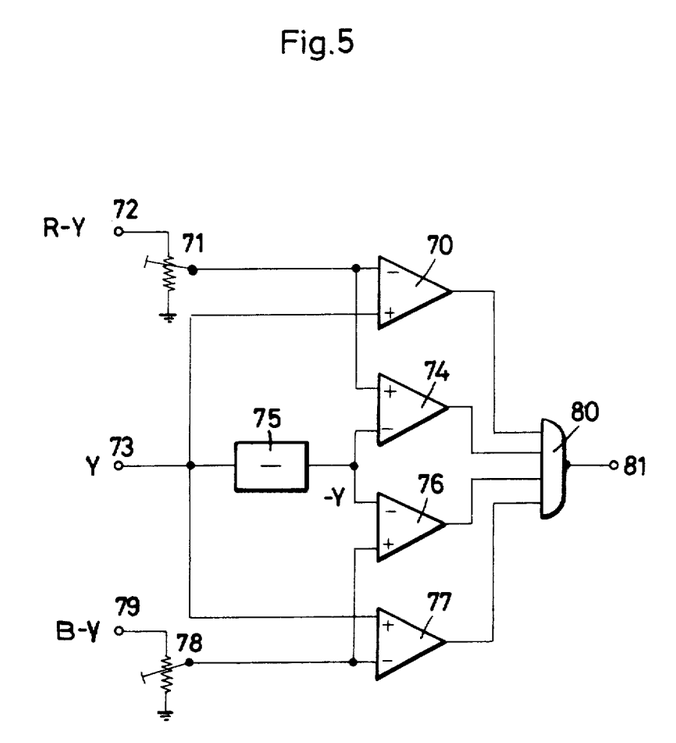
FIG. 5 is a circuit of a chroma-saturation threshold detector with simultaneous standardization of color-difference signal.

By means of a circuit arrangement as in FIG. 5, the blocks 19, 20, and 21 shown in FIG. 2 can be embodied at small circuit expense. A color-difference signal R − Y present at a terminal 72 is fed to the inverse input of a first comparator 70 via a first potentiometer 71. A luminance signal Y (terminal 73) is present at the non-inverse input. The non-inverse input of a second comparator 74 is connected to the inverse input of the first comparator 70. The luminance signal tapped at terminal 73 is invented by means of an inverting stage 75 and is fed to the inverse input of a second comparator 74 and to the inverse input of a third comparator 76. A color difference signal B − Y present at a terminal 79 is fed via a potentiometer 78 to the non-inverse input of a third comparator 76 and to the inverse input of a fourth comparator 77. Luminance signal Y is present at the non-inverse input of of a fourth comparator 77. The outputs of the four comparators 70, 74, 76, and 77 are connected to the inputs of a NAND gate 80, at whose output a signal characterizing a low chroma-saturation in the color television picture can be tapped by means of terminal 81. The voltage level at terminal 81 becomes L only when all voltage levels are present at the comparator outputs H. By means of the luminance signal feed described above to the individual comparator inputs, a standarization of the color-difference signals present at the other comparator inputs is achieved. The first comparator 70 serves to detect positive signal portions in the color-difference signal R − Y. Correspondingly, negative signal portions in the color-difference signal B − Y, are detected by means of comparator 76, and positive signal portions by means of the fourth comparator 77. By means of potentiometers 71 and 78 the prespecified chroma-saturation thresholds are set.

What is claimed is:

1. A system for automatic correction of the balance between the primary color singals of color video signal source, comprising:
   A. a primary color signal channel for each of a plurality of primary colors,
   B. a signal-corrector means in each signal channel for receiving the corresponding primary color signal and responsive to control signals for generating corresponding correction signals.
   C. adder means in each signal channel for additively combining the corresponding primary color signal and the corresponding correction signal to generate a corresponding corrected signal for each primary color, and
   D. a color corrector responsive to the corrected signals for all of the plurality of primary colors for generating said control signals, the color corrector comprising level-detection means for determining when a prespecified luminosity level occurs in the color video signal and when simultaneously the chroma-saturation of the color video signal is below a predetermined chroma-saturation threshold for recognizing the chromaticity present at that moment in the color video signal, and means responsive to the chromaticity thus recognized for deriving and storing said control signals, whereby the control signals cause aberrations in color balance in the color video signal to be reduced.

2. A system according to claim 1, further comprising a matrix means in the color corrector responsive to the corrected primary color signals for driving color difference signals R − Y and B − Y.

3. A system according to claim 2, wherein the matrix means is also operative to derive a luminance signal Y.

4. A system according to claim 2, wherein a luminance signal Y is obtained as a separate signal from the color video signal source.

5. A system according to claim 2, wherein the detection of the chroma saturations in the color television picture which range below a prespecified chroma-saturation threshold are carried out by the level-detection means as a function of the signal amplitudes of the color-difference signals derived by the matrix.

6. A system according to claim 2, further comprising:
A. standardizing means for driving standardized color-difference signals, and
B. level-detector means responsive to the standardized color-difference signals for detecting those chroma-saturations in the color video signal which fall below said predetermined chroma-saturation threshold.

7. A system according to claim 6 wherein the standardizing means comprises:
A. two division circuits, each having a division input, a dividend input and a quotient output,
B. means for applying the color-difference signal from the matrix to the respective dividend inputs, and
C. means for applying the luminence signal to the divisor inputs,
whereby the standardized color-difference signals are obtained from the respective quotient outputs.

8. A system according to claim 7, further comprising means for clamping the luminance signal and the color-difference signals from the matrix to a predetermined potential.

9. A system according to claim 8, further comprising a plurality of chroma-saturation threshold detectors respectively responsive to each of the color difference signals for providing a signal of one level when the chroma-saturation is above a predetermined chroma-saturation threshold and for providing a signal of a distinctive second level when the chroma-saturation is bleow that predetermined threshold.

10. System according to claim 9, wherein each chroma-saturation threshold detector comprises a NAND gate having two inputs which are connected respectively to outputs of first and second sum-and-difference amplifier devices, wherein each amplifier device is connected in such a way that an inverse input of each amplifier is connected to a tapping point of a corresponding voltage divider connected between a ground and a negative potential, and is connected to the cathode of a first diode, furthermore that a non-inverse input of each amplifier is connected via a second resistor to the output of the same amplifier and to the anode of a second diode, and that the anode of the first diode and the cathode of the second diode are connected to the slide of a potentiometer for the voltage division of one of the two color difference signals, and wherein finally at the output of the NAND gate a signal with a low voltage level can be obtained when the chroma-saturation of the color television picture ranges below the prespecified chroma-saturation threshold.

11. System according to claim 10, further comprising integration circuits to inputs of which via electronic color difference signals are applied via electronic switches and at the outputs of which control signals can be obtained.

12. System according to claim 11, wherein the contact paths of a first group of electronic switches are closed only when, by means of a first threshold value circuit, with the aid of the luminance signal, right picture portions are detected when the chroma-saturation threshold detector recognizes in the matricized color difference signals a chroma-saturation below the prespecified chroma-saturation threshold and when no blanking interval is present in the primary signals.

13. System according to claim 12, wherein the bright picture portions are detected with the aid of the luminance signal by means of a threshold-value circuit, the threshold value of which is controlled as a function of a detected peak white value in the luminance signal.

14. Systm according to claim 13, wherein the luminance signal is fed to the base electrode of a transistor and to the non-inverse input of a sum-and-difference amplifier and wherein the emitter electrode of the transistor is connected via an R − C element connected in parallel to a ground potential and via a resistor to a positive potential, and wherein the collector electrode of the transistor is connected to the positive potential, and wherein the emitter electrode of the transistor is connected, via an impedance transformer to the non-inverse input of the sum-and-difference amplifier.

15. System according to claim 11, wherein the contact paths of a second group of electronic switches are closed only when, by means of a second threshold value circuit with the aid of the luminance signal, dark picture portions are detected, when the chroma-saturation threshold detector recognizes in the matricized color difference signals a chroma-saturation below a prespecified chroma-saturation threshold and when no blanking signal is present in the primary signal.

16. System according to claim 11, wherein the contact paths of a thrid group of electronic switches are closed only when, by means of the first and second threshold value circuit, neither a dark nor a bright picture portion is detected with the aid of the luminance signal, when the chroma-saturation threshold detector recognizes in the standardized color difference signals a chroma-saturation ranging below the prespecified chroma-saturation threshold, and when no blanking interval in the color primary signals exists.

17. System according to claim 16, wherein at the outputs of the integration circuits connected in series to each circuit group, a dematrix is provided for the purpose of transferring the control signals into the planes of the primary signals.

18. System according to claim 17, wherein the balance of the control signals produced according to the prespecified luminosity stages and the chroma-saturation in the color television picture can be controlled manually by means of a control-device.

19. System according to claim 16, wherein a luminance signal produced by the color signal source is fed to the color corrector.

20. System according to claim 1, wherein the transit time of the primary signal is adapted by means of a delay stage to the signal transit time of the corrector stage.

21. System according to claim 1, further comprising a chroma-saturation threshold detector consisting of a first comparator to the inverse input of which a first color-difference signal is applied, and to the non-inverse input of which a luminance signal is applied, further comprising a second comparator to the non-inverse input of which the first color-difference signal is applied and to the inverse input of which an inverted luminance signal is applied, further comprising a third comparator to the inverse input of which the inverted luminance signal is applied and to the non-inverse input of which a second color-difference signal is applied, further comprising a fourth comparator to the non-inverse input of which the luminance signal is applied and to the inverse input of which the second color-difference signal is fed, and further comprising a NAND gate with four inputs and one output, wherein the inputs are respectively connected to the four outputs of the four comparators and wherein at the output a signal with a low voltage level can be obtained when the chroma-saturation of the color television picture ranges below the prespecified chroma-saturation threshold.

* * * * *